US009218079B2

(12) United States Patent
Lee

(10) Patent No.: US 9,218,079 B2
(45) Date of Patent: Dec. 22, 2015

(54) IN-CELL TOUCH DISPLAY PANEL STRUCTURE

(71) Applicant: SuperC-Touch Corporation, New Taipei (TW)

(72) Inventor: Hsiang-Yu Lee, New Taipei (TW)

(73) Assignee: SuperC-Touch Corporation, New Taipei (TW)

( * ) Notice: Subject to any disclaimer, the term of this patent is extended or adjusted under 35 U.S.C. 154(b) by 0 days.

(21) Appl. No.: 14/520,845

(22) Filed: Oct. 22, 2014

(65) Prior Publication Data
US 2015/0049264 A1  Feb. 19, 2015

Related U.S. Application Data

(63) Continuation-in-part of application No. 14/151,093, filed on Jan. 9, 2014.

(30) Foreign Application Priority Data

Jan. 10, 2013 (TW) .............................. 102200535 U
Oct. 23, 2013 (TW) .............................. 102219711 U

(51) Int. Cl.
*G02F 3/00* (2006.01)
*G06F 3/041* (2006.01)
*G02F 1/1333* (2006.01)
*G02F 1/1335* (2006.01)
*G02F 1/1362* (2006.01)

(52) U.S. Cl.
CPC ............ *G06F 3/041* (2013.01); *G02F 1/13338* (2013.01); *G02F 1/133512* (2013.01); *G02F 1/136286* (2013.01)

(58) Field of Classification Search
CPC .......... G02F 1/13338; G02F 1/133512; G02F 1/136286; G06F 3/0412
See application file for complete search history.

(56) References Cited

U.S. PATENT DOCUMENTS

2010/0156827 A1* 6/2010 Joo ..................... G02F 1/13338
                                                                   345/173
2015/0054786 A1* 2/2015 Wang ..................... G06F 3/044
                                                                   345/174

* cited by examiner

*Primary Examiner* — Anne Hines
(74) *Attorney, Agent, or Firm* — Muncy, Geissler, Olds & Lowe, P.C.

(57) ABSTRACT

An in-cell touch display panel structure includes upper and lower substrates, a black matrix layer, a thin film transistor and sensing electrode layer including a gate line sub-layer and a source line sub-layer. The gate line sub-layer includes plural gate lines and plural first sensing conductor segments. The source line sub-layer includes plural source lines and plural second sensing conductor segments. The first and second sensing conductor segments are disposed corresponding to positions of opaque lines of the black matrix layer. The second sensing conductor segments are divided into a first group including plural second sensing conductor segments and a second group including plural second sensing conductor segments. The second sensing conductor segments of the first group and the first sensing conductor segments are formed with N quadrilateral regions, where N is a positive integer and any two quadrilateral regions are not connected with each other.

15 Claims, 9 Drawing Sheets

IN-CELL TOUCH DISPLAY PANEL STRUCTURE

CROSS REFERENCE TO RELATED APPLICATION

This application claims the benefits of the Taiwan Patent Application Serial Number 102219711, filed on Oct. 23, 2013, the subject matter of which is incorporated herein by reference.

This application is a continuation-in-part (CIP) of U.S. Patent application for an "In-cell touch display panel structure with metal layer on lower substrate for sensing", U.S. application Ser. No. 14/151,093, filed on Jan. 9, 2014.

BACKGROUND OF THE INVENTION

1. Field of the Invention

The present invention relates to a display screen structure with a touch panel and, more particularly, to an in-cell touch display panel structure.

2. Description of Related Art

Modern consumer electronic apparatuses are typically equipped with touch panels for use as their input devices. According to different sensing manners, the touch panels can be classified into resistive type, capacitive type, acoustic type, and optical type.

A conventional touch display panel includes a touch panel and a display unit overlapped with the touch panel. The touch panel is configured as an operation interface. The touch panel is transparent so that an image generated by the display unit can be viewed directly by a user without being sheltered by the touch panel. Such well-known skill of the touch panel may increase additional weight and thickness of the touch display panel, and may further reduce the light penetration rate, and increase reflectance and haze of the touch display panel.

On-cell and in-cell touch technology were invented to overcome the drawbacks of traditional touch technology described above. The on-cell technology is to dispose a sensor on the back side of a color filter substrate to form a completed color filter substrate.

The in-cell technology is to dispose the sensor within the thin film transistor layer, such as disposing the sensor within the LCD cell structure. Currently, there are resistive, capacitive and optical three primary in-cell touch technologies, wherein the resistive touch technology employs two conductive substrates and the voltage variation of a common layer between the two substrates for determining a touch position on the touch display panel.

The in-cell touch technology is provided to integrate the touch sensor within the display unit so that the display unit is provided with the ability of the touch panel. Therefore, the touch display panel does not need to be bonded with an additional touch panel so as to simplify the assembly procedure. Such skill is generally developed by display panel manufactures.

There is older touch control technology known as out-cell, which is typically applied to the resistive and capacitive touch panels. The out-cell touch technology is provided to add a touch module onto a display module. The touch module and the display module can be manufactured by the two separated firms.

However, for all the in-cell, on-cell and out-cell touch technologies, they all need a sensing electrode layer made of transparent material (Indium Tin Oxide, ITO) to be configured on an upper or lower glass substrate, which not only increases the manufacturing cost but also complicates the manufacturing process, and which may also lower the aperture ratio and thus need to increase the strength of backlight, resulting in huge power consumption which is disadvantageous to make the mobile device compact. Therefore, it desired for the aforementioned touch display panel structure to be improved.

SUMMARY OF THE INVENTION

The object of the present invention is to provide an in-cell touch display panel structure for greatly saving the material cost and processing cost. Because there is no need to provide a sensing electrode layer made of ITO material on an upper or lower glass substrate of a display panel, the manufacturing cost can be reduced and manufacturing process can be simplified.

In one aspect of the present invention, there is provided an in-cell touch display panel structure, which comprises: an upper substrate; a lower substrate parallel to the upper substrate; a display material layer configured between the upper substrate and the lower substrates; a black matrix layer disposed at one surface of the upper substrate facing the display material layer, the black matrix layer being composed of a plurality of opaque lines; and a thin film transistor and sensing electrode layer disposed at one side of the lower substrate facing the display material layer. The thin film transistor and sensing electrode layer includes: a gate line sub-layer including a plurality of gate lines arranged in a first direction, and a plurality of first sensing conductor segments arranged in the first direction and parallel to the plurality of gate lines; and a source line sub-layer disposed at one side of the gate line sub-layer facing the display material layer, including a plurality of source lines arranged in a second direction, and a plurality of second sensing conductor segments arranged in a second direction and parallel to the plurality of source lines. The plurality of first sensing conductor segments and the plurality of second sensing conductor segments are disposed at positions corresponding to those of the plurality of opaque lines of the black matrix layer. The plurality of second sensing conductor segments are divided into a first group including a plurality of second sensing conductor segments and a second group including a plurality of second sensing conductor segments. The plurality of second sensing conductor segments of the first group and the plurality of first sensing conductor segments are formed with N quadrilateral regions, where N is a positive integer and any two quadrilateral regions are not connected with each other, so as to form a single-layered touch pattern on the thin film transistor and sensing electrode layer.

In another aspect of the present invention, there is provided an in-cell touch display panel structure, which includes: an upper substrate; a lower substrate parallel to the upper substrate; a display material layer configured between the upper substrate and the lower substrates; and a thin film transistor and sensing electrode layer disposed at one side of the lower substrate facing the display material layer. The thin film transistor and sensing electrode layer includes: a gate line sub-layer including a plurality of gate lines arranged in a first direction, and a plurality of first sensing conductor segments arranged in the first direction and parallel to the plurality of gate lines; and a source line sub-layer disposed at one side of the gate line sub-layer facing the display material layer, including a plurality of source lines arranged in a second direction, and a plurality of second sensing conductor segments arranged in the second direction and parallel to the plurality of source lines. The plurality of second sensing conductor segments are divided into a first group including a plurality of second sensing conductor segments and a second group including a plurality of second sensing conductor segments. The plurality of second sensing conductor segments of the first group and the plurality of first sensing conductor segments are formed with N quadrilateral regions, where N is a positive integer, and any two quadrilateral regions are not connected with each other, so as to form a single-layered touch pattern on the thin film transistor and sensing electrode layer.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
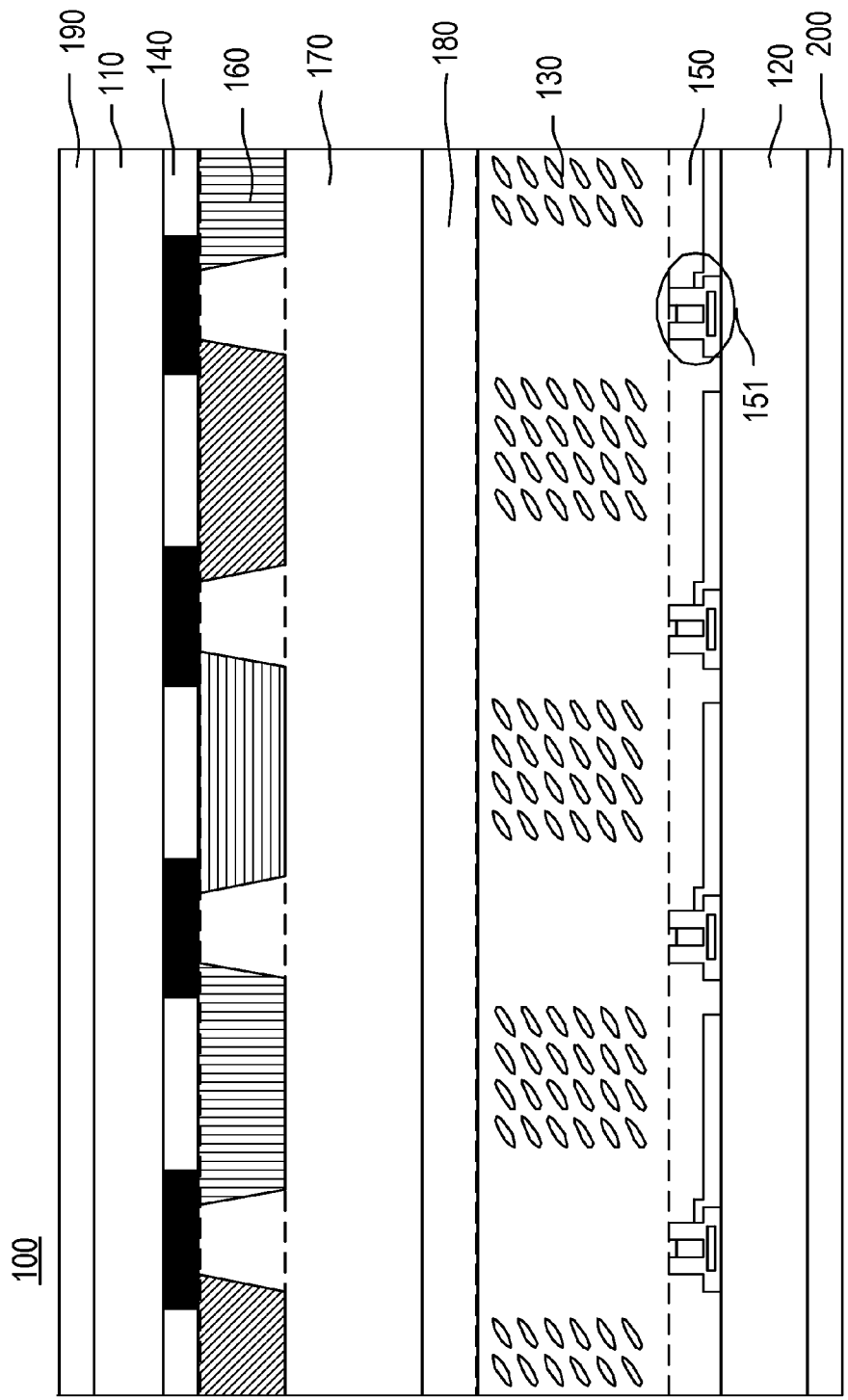
FIG. 1 is a stack-up diagram of an in-cell touch display panel structure in accordance with a preferred embodiment of the present invention.

FIG. 1 is a stack-up diagram of an in-cell touch display panel structure 100 in accordance with a preferred embodiment of the present invention. As shown, the in-cell touch display panel structure 100 includes an upper substrate 110, a lower substrate 120, a display material layer 130, a black matrix layer 140, a thin film transistor and sensing electrode layer 150, a color filter layer 160, an over coating layer 170, a common electrode (Vcom) layer 180, a first polarizer layer 190, and a second polarizer layer 200.

The upper substrate 110 and the lower substrate 120 are preferably glass substrates and are parallel to each other. The display material layer 130 is disposed between the upper and lower substrates 110, 120. The display material layer 130 is a liquid crystal layer in this embodiment.

The black matrix layer 140 is disposed at one surface of the upper substrate 110 that faces the display material layer 130. The black matrix layer 140 is composed of a plurality of opaque lines.

Figure 2:
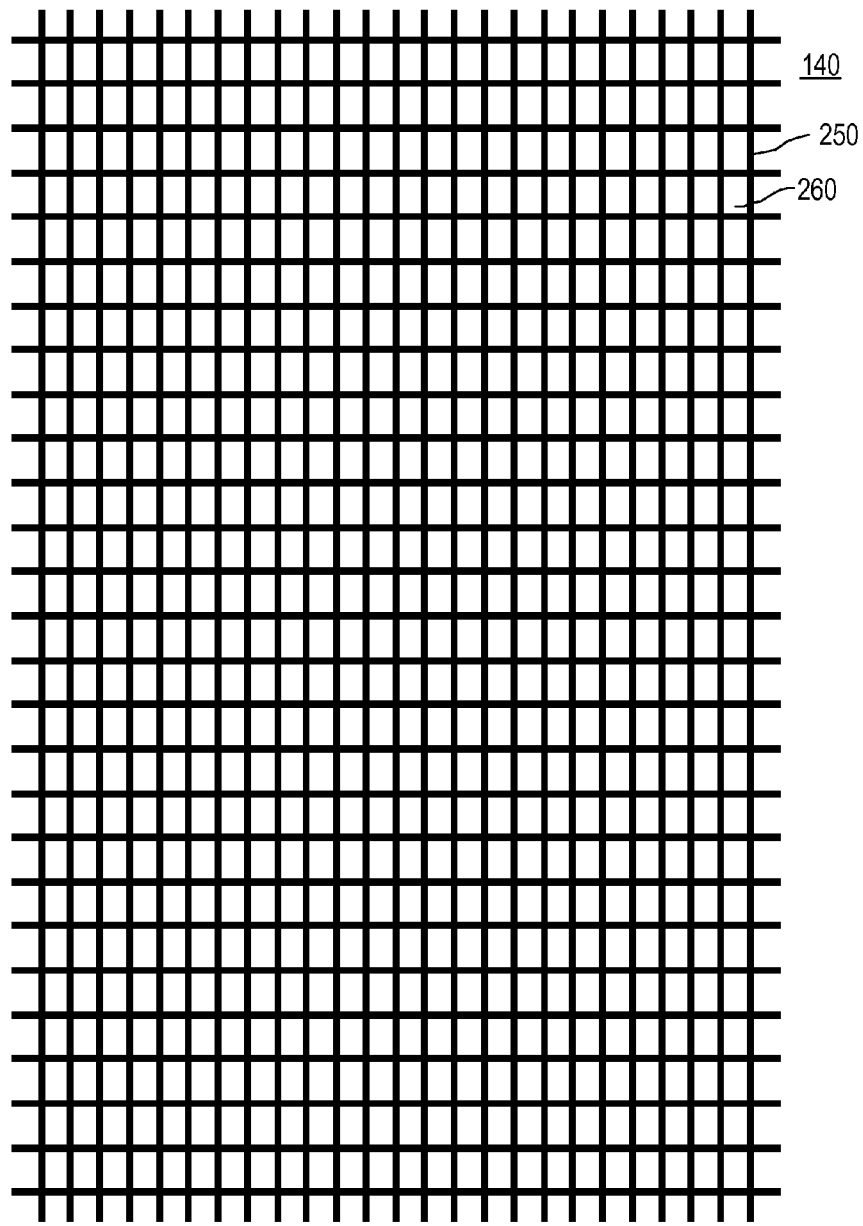
FIG. 2 shows a black matrix layer.

FIG. 2 schematically illustrates the black matrix layer 140, which is the same as that of the prior LCD device. As shown in FIG. 2, the black matrix layer 140 is composed of lines 250 of insulating material that are black and opaque for forming the plurality of opaque lines 250. The lines 250 of black insulating material are arranged as a checkerboard pattern, the color filter layer is disposed in the areas 260 among the lines of black insulating material.

In prior LCD panel structure, the thin film transistor layer is disposed at one surface of the lower substrate (120) that faces the display material layer (130). The prior thin film transistor layer is composed of thin film transistors (151) and transparent electrodes.

In the present invention, a plurality of first sensing conductor segments disposed by the side of a plurality of gate lines and a plurality of second sensing conductor segments disposed by the side of a plurality of source lines are provided in the prior thin film transistor layer, so as to form the thin film transistor and sensing electrode layer 150 in accordance with the present invention. Therefore, there is no need to arrange a sensing electrode layer on the upper glass substrate or the lower glass substrate of an LCD display panel, so as to reduce the manufacturing cost, simplify the manufacturing process and increase the yield rate. The thin film transistor and sensing electrode layer 150 is between the lower substrate 120 and the display material layer 130 and is disposed at one surface of the lower substrate 120 that faces the display material layer 130, wherein the thin film transistor and sensing electrode layer 150 includes a gate line sub-layer and a source line sub-layer.

Figure 3:
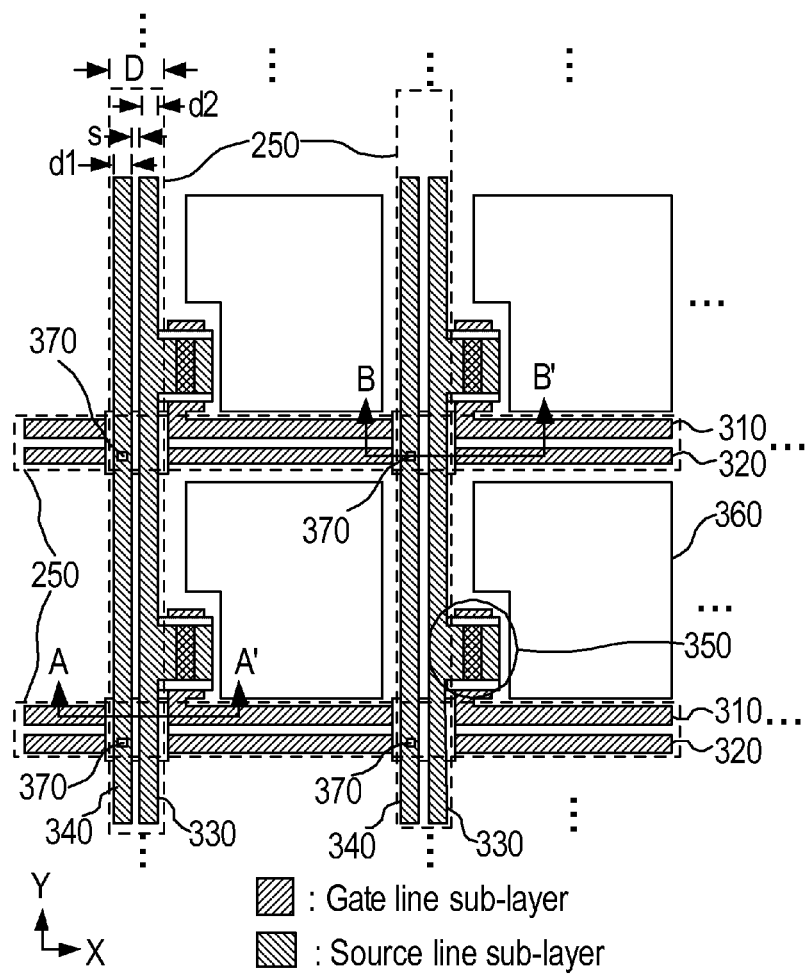
FIG. 3 schematically illustrates the thin film transistor and sensing electrode layer according to the present invention.

FIG. 3 schematically illustrates the thin film transistor and sensing electrode layer 150 in accordance with the present invention, which is viewed from the upper substrate 110 to the lower substrate 120. The thin film transistor and sensing electrode layer 150 includes a gate line sub-layer and a source line sub-layer.

Figure 5:
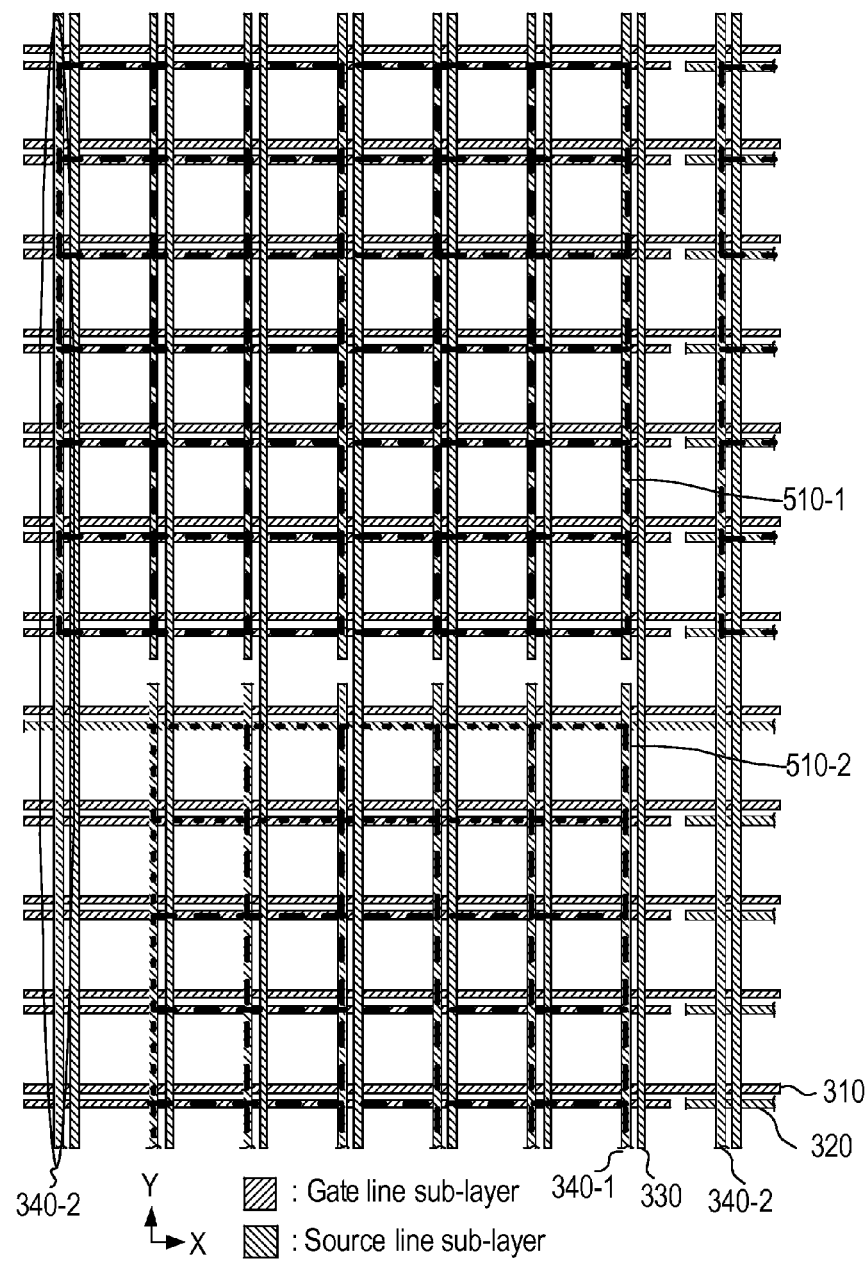
FIG. 5 is a schematic diagram of the plurality of sensing conductor segments according to the present invention.

The gate line sub-layer includes a plurality of gate lines 310 and a plurality of first sensing conductor segments 320. The plurality of gate lines 310 are arranged in a first direction (X-axis direction), and the plurality of first sensing conductor segments 320 are arranged in the first direction and parallel to the plurality of gate lines 310. As shown in FIG. 3, the gate line sub-layer is represented by slashes. In addition, several first sensing conductor segments 320 are separately continued in the first direction to form a first sensing conductor line disposed by the side of a corresponding gate line 310, as shown in FIG. 5.

The source line sub-layer is disposed at one surface of the gate line sub-layer facing the display material layer 130, and includes a plurality of source lines 330 and a plurality of second sensing conductor segments 340. The plurality of source lines 330 are arranged in a second direction (Y-axis direction). The plurality of second sensing conductor segments 340 are arranged in the second direction and parallel to the plurality of source lines 330. As shown in FIG. 3, the source line sub-layer is represented by backslashes, wherein the first direction is substantially vertical to the second direction. In addition, at least one of the second sensing conductor segments 340 is separately continued in the second direction to form a second sensing conductor line disposed by the side of a corresponding source line 330, as shown in FIG. 5.

The plurality of first sensing conductor segments 320 and the plurality of second sensing conductor segments 340 are disposed at positions corresponding to the positions of the plurality of opaque lines 250 of the black matrix layer 140.

In FIG. 3, the opaque lines 250 of the black matrix layer 140 are shown and represented by dotted lines as the opaque lines 250 are not belonged to the thin film transistor and sensing electrode layer 150. As shown in FIG. 3, the plurality of first sensing conductor segments 320 and the plurality of second sensing conductor segments 340 are disposed at positions corresponding to the positions of the plurality of opaque lines 250 of the black matrix layer 140. That is, summation of the line width (d2) of the source line 330, the line width (d1) of the second sensing conductor segment 340, and the spacing (s) between the source line 330 and second sensing conductor segment 340 is preferred to be smaller or equal to the line width (D) of the opaque line 250. In this embodiment, we have d1+d2+s<D. Moreover, because the gate lines 310 and the source lines 330 are disposed at positions corresponding to the positions of the plurality of opaque lines 250 of the black matrix layer 140, the gate lines 310, the first sensing conductor segments 320, the source lines 330, and the second sensing conductor segments 340 can be concealed by the plurality of opaque lines 250 when viewing from the upper substrate 110 to the lower substrate 120. The thin film transistor and sensing electrode layer 150 further includes a plurality of transistors 350 and a plurality of pixel regions 360.

Figure 4A:
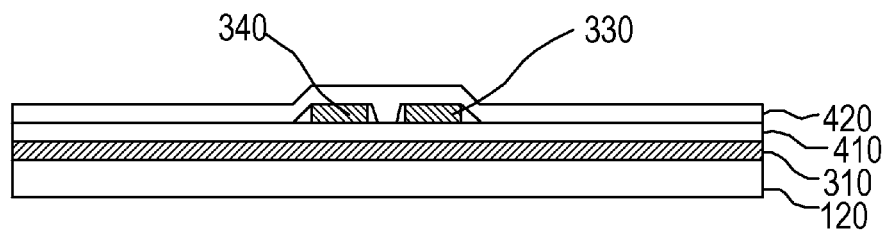
FIGS. 4A and 4B respectively illustrate two embodied cross sectional views taking along A-A' line of FIG. 3.
Figure 4B:
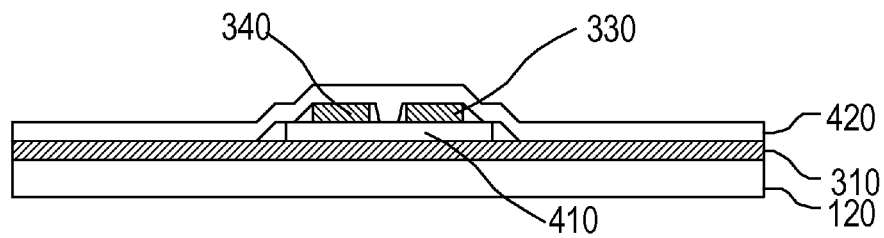

FIGS. 4A and 4B respectively illustrates two embodied cross sectional views taking along A-A' line of FIG. 3. As shown in FIG. 4A, the gate lines 310 is arranged on the lower substrate 120 and there is a first insulation layer 410 arranged above the gate line 310 so that the source line 330, the second sensing conductor segment 340, and the gate line 310 are insulated from each other. There is a second insulation layer 420 arranged above the source line 330 and the second sensing conductor line 340. In FIG. 4B, the first insulation layer 410 is primarily provided for allowing the source line 330 and the second sensing conductor segment 340 to be insulated from the gate line 310 and the first sensing conductor segment 320, and thus the first insulation layer 410 is arranged only at an intersection thereof.

Figure 4C:
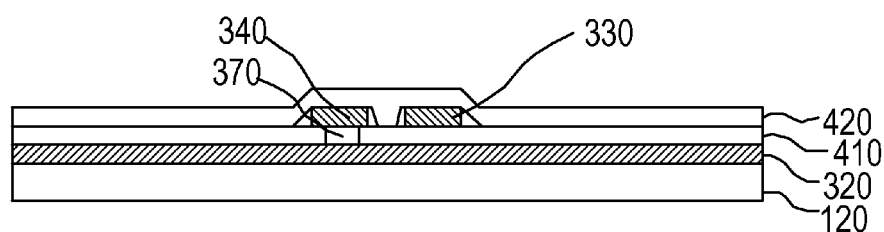
FIG. 4C illustrates a cross sectional view taking along B-B' line of FIG. 3.

FIG. 4C illustrates a cross sectional view taking along B-B' line of FIG. 3. As shown in FIG. 4C, the first sensing conductor line 320 is arranged on the lower substrate 120 and there is a first insulation layer 410 arranged above the first sensing conductor segment 320, so that the source line 330 and the first sensing conductor segment 320 are insulated from each other. A via 370 is arranged between the second sensing conductor segment 340 and the first sensing conductor segment 320, so as to electrically connect the second sensing conductor segment 340 to the first sensing conductor segment 320.

FIG. 5 is a schematic diagram of the plurality of sensing conductor segments in accordance with the present invention, which is viewed from the upper substrate 110 to the lower substrate 120. The plurality of second sensing conductor segments 340 are divided into a first group including a plurality of second sensing conductor segments 340-1 and a second group including a plurality of second sensing conductor segments 340-2. The plurality of second sensing conductor segments 340-1 of the first group and the plurality of first sensing conductor segments 320 are formed with N quadrilateral regions 510, where N is a positive integer, and any two quadrilateral regions 510 are not electrically connected, so as to form a structure with touch pattern on the thin film transistor and sensing electrode layer 150.

As shown in FIG. 5, the quadrilateral regions are represented by dotted lines. In FIG. 5, the quadrilateral region 510-1 is a square composed of seven first sensing conductor segments 320 in the first direction and seven second sensing conductor segments 340-1 of the first group, which is shown for illustrative purpose only. In other embodiments, the number of sensing conductor segments can be varied according to the actual requirement. In actual application, the quadrilateral region 510 is composed hundreds of the second sensing conductor segments 340-1 of the first group and the first sensing conductor lines 320.

The second sensing conductor segments 340-2 of the second group are formed with N conductor traces. Each of the N conductor traces is electrically connected to corresponding quadrilateral region 510, while any two conductor traces are not electrically connected. As shown in FIG. 5, the quadrilateral region 510-1 is extended from the second sensing conductor segment 340-2 of the second group, as denoted by an ellipse, for connecting to a control circuit (not shown).

The plurality of first sensing conductor segments 320 of the thin film transistor and sensing electrode layer 150 and the plurality of second sensing conductor segments 340 are made of conductive metal material, wherein the conductive metal material is selectively to be chromium, barium, aluminum, silver, copper, titanium, nickel, tantalum, tungsten, magnesium, calcium, potassium, lithium, indium, and alloy thereof, or mixture of lithium fluoride, magnesium fluoride, oxide and aluminum.

Figure 6:
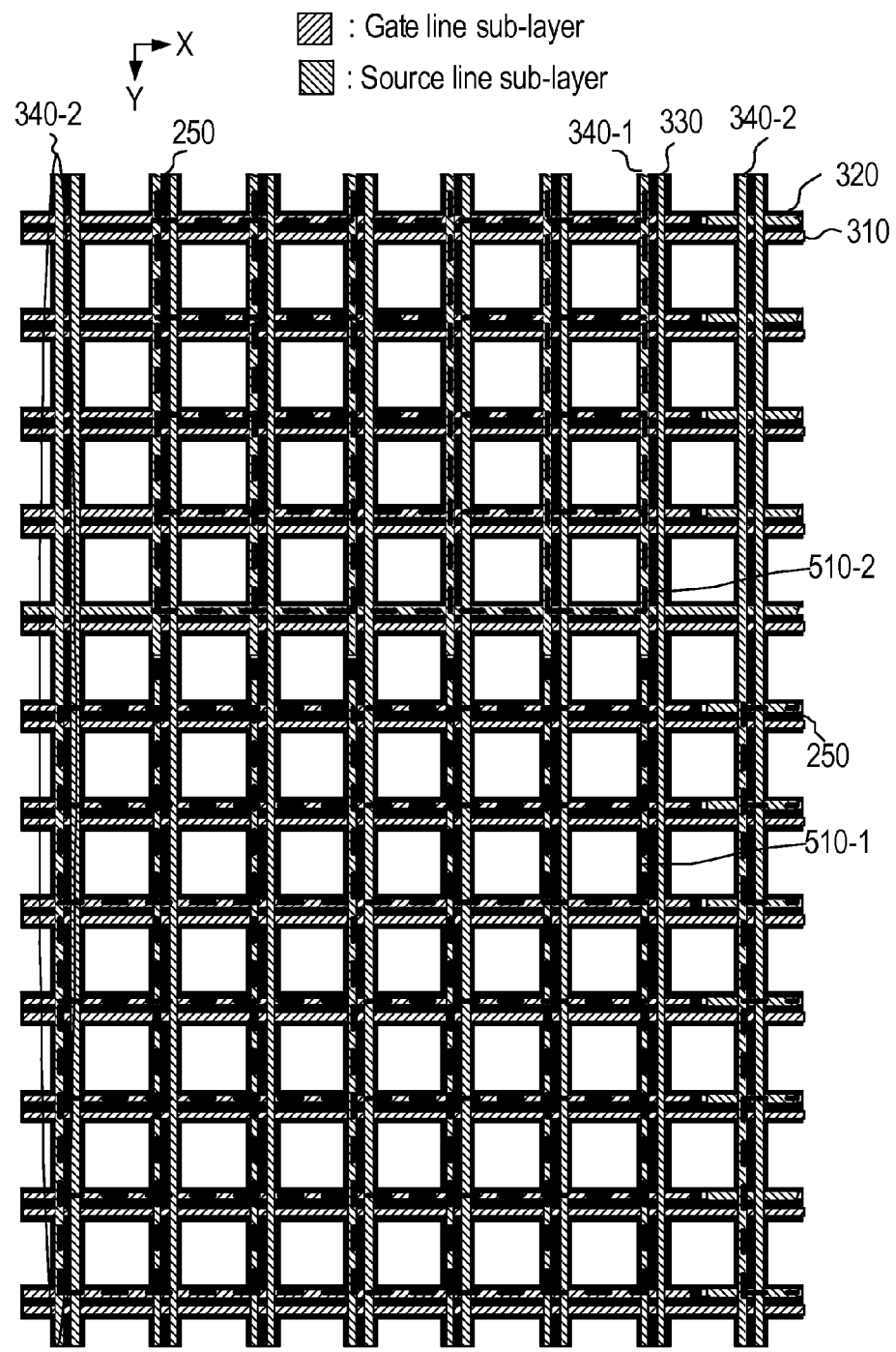
FIG. 6 is a schematic diagram of the black matrix layer and the plurality of first sensing conductor segments and the plurality of second sensing conductor segments according to the present invention.

FIG. 6 is a schematic diagram of the black matrix layer 140, the plurality of first sensing conductor segments 320, and the plurality of second sensing conductor segments 340 in accordance with the present invention, which is viewed from the lower substrate 120 to the upper substrate 110. As shown, when viewing from the upper substrate 110 to the lower substrate 120, the source lines 330, the second sensing conductor segments 340, the gate lines 310, and the first sensing conductor segments 320 can be concealed by the opaque lines 250, so that users do not see the source lines 330, the second sensing conductor segments 340, the gate lines 310 and the first sensing conductor segments 320.

Figure 7:
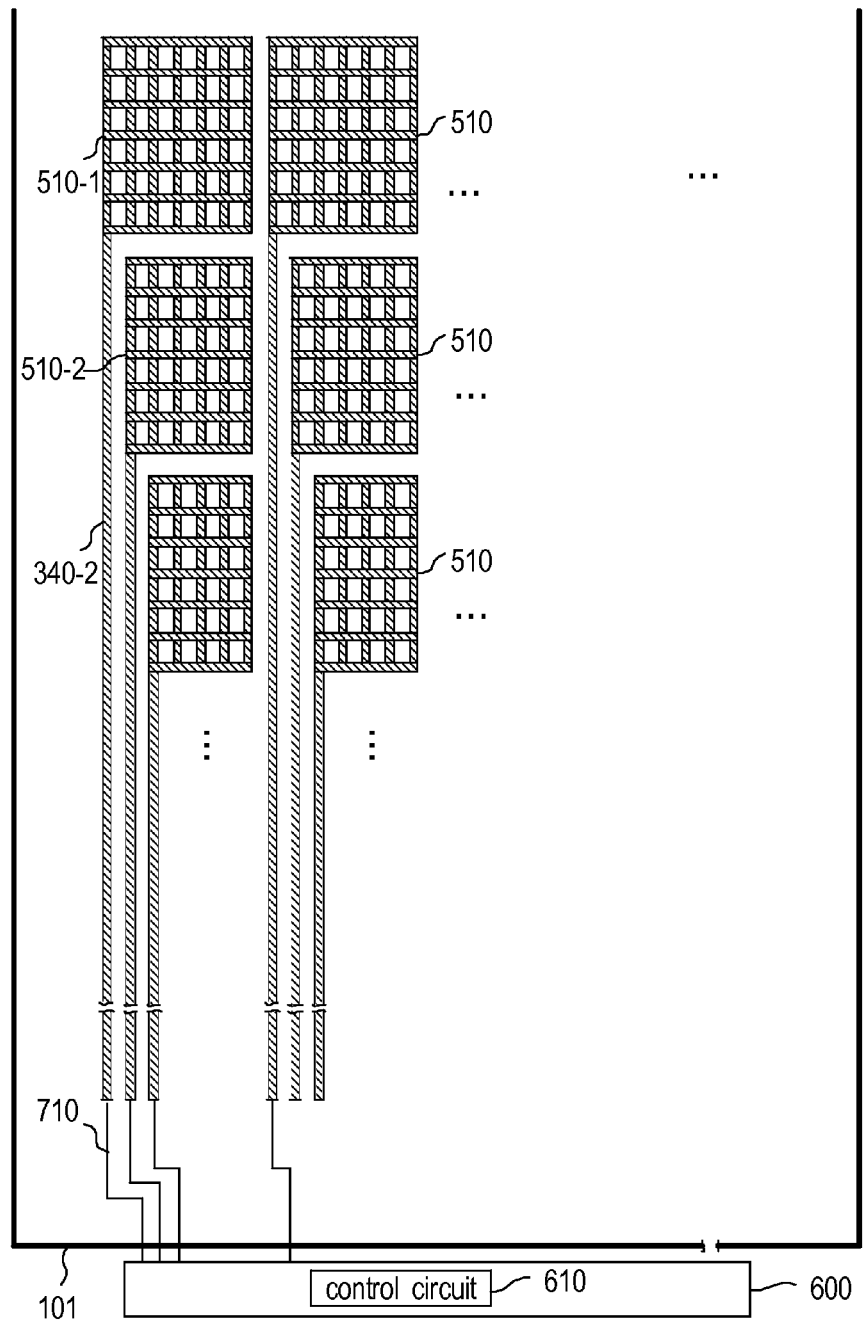
FIG. 7 is another schematic diagram of the plurality of first sensing conductor segments and the plurality of second sensing conductor segments according to the present invention.

FIG. 7 is another schematic diagram of the first sensing conductor segments 320 and the second sensing conductor segments 340. As shown, the quadrilateral region 510-1 is extended downward through a second sensing conductor line 340-2 of second group, so as to be further extended to one side 101 of the in-cell touch display panel structure 100 through a conductive trace 710 to extend for connecting to the control circuit 610 of a flexible circuit board 600.

As shown in FIG. 7, the number of second sensing conductor segments 340-1 of the quadrilateral region 510-2 is one less than that of the quadrilateral region 510-1. However, in actual application, the quadrilateral region is typically composed of hundreds of second sensing conductor segments 340-1 of the first group and the first sensing conductor segments 320. Therefore, the difference between the voltages detected by the quadrilateral region 510-1 and the quadrilateral region 510-2 is insignificant, so as not influence the sensitivity of touch sensing. In addition, electronic circuit devices, such as operational amplifiers, in the control circuit 610 can be used to adjust the sensed voltage.

The color filter layer 160 is disposed on one surface of the black matrix layer 140 that faces the display material layer 130. The common electrode layer 180 is disposed between the upper substrate 110 and the lower substrate 120. The first polarizer layer 190 is disposed at the other surface of the upper substrate 110 opposite to the surface facing to the display material layer 130. The second polarizer layer 200 is disposed at the other surface of the lower substrate 120 opposite to the surface facing the display material layer 130.

Figure 8:
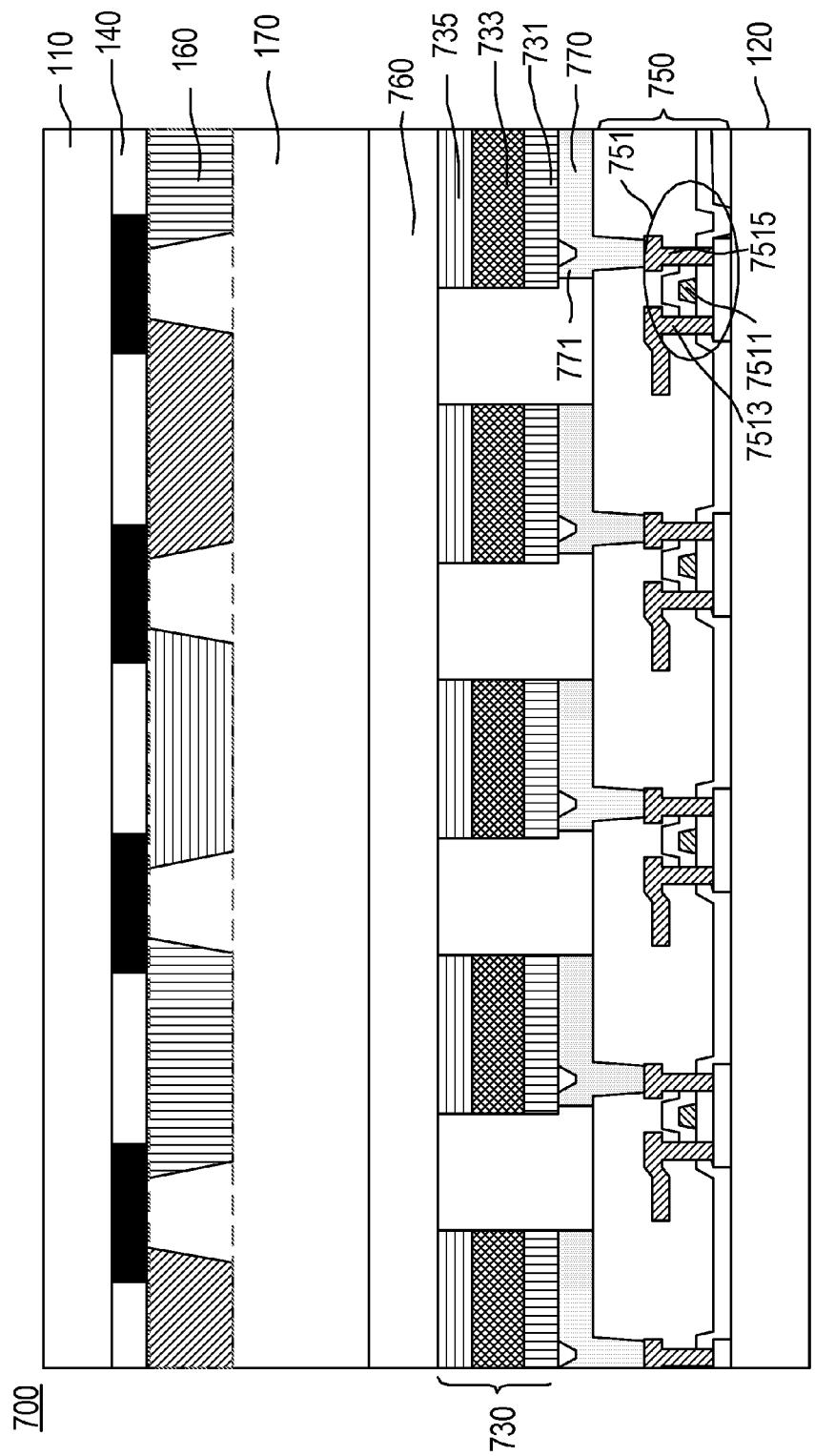
FIG. 8 is a stack-up diagram of another embodiment according to the present invention.

FIG. 8 shows another embodiment of the present invention, which is a stack-up diagram of an in-cell touch display panel structure 700. As shown, the in-cell touch display panel structure 700 includes an upper substrate 110, a lower substrate 120, a display material layer 730, a black matrix 140, a thin film transistor and sensing electrode layer 750, a color filter layer 160, an over coating layer 170, a cathode layer 760, and an anode layer 770.

FIG. 8 is similar to FIG. 1 except for the display material layer 730, the cathode layer 760, the anode layer 770, and the thin film transistor and sensing electrode layer 750.

The upper substrate 110 and the lower substrate 120 are preferably glass substrates or plastic substrates. The upper substrate 110 and lower substrate 120 are parallel to each other and the display material layer 730 is disposed between the upper and lower substrates 110, 120, wherein the display material layer 730 is preferably an organic light emitting diode (OLED) layer.

In this embodiment, a plurality of first sensing conductor segments disposed by the side of a plurality of gate lines and a plurality of second sensing conductor segments disposed by the side of a plurality of source lines are provided in the prior thin film transistor layer, so as to form the thin film transistor and sensing electrode layer 750 of the present invention. Therefore, there is no need to arrange a sensing electrode layer which is made of transparent conductor material on the upper glass substrate or the lower glass substrate of a display panel, so as to reduce the manufacturing cost, simplify the manufacturing process and increase the yield rate.

The details for the plurality of gate lines 310 of the thin film transistor and sensing electrode layer 750, the plurality of first sensing conductor segments 320, the plurality of source lines 330, and the plurality of second sensing conductor segments 340 are similar to the disclosure of the first embodiment and FIGS. 3-6, and thus a detailed description therefor is deemed unnecessary.

The thin film transistor and sensing electrode layer 750 is disposed on one side of the lower substrate 120 that faces the display material layer 730. The thin film transistor and sensing electrode layer 750 includes a plurality of gate lines (not shown), a plurality of source lines (not shown), a plurality sensing conductor segments (not shown) arranged in the first direction, a plurality of second sensing conductor segments arranged in the second direction, and a plurality of pixel driving circuits 751, each corresponding to a pixel, so as to drive a corresponding pixel driving circuit 751 based on a display pixel signal and a display driving signal thereby performing a display operation.

According to different designs of the pixel driving circuit 751, such as 2T1C being a pixel driving circuit formed with two thin film transistors and a storage capacitor, and 6T2C being a pixel driving circuit formed with six thin film transistors and two storage capacitors, the gate 7511 of at least one thin film transistor in the pixel driving circuit 751 is connected to a gate line (not shown). According to different designs of driving circuit, a source/drain 7513 of at least one thin film transistor in a control circuit is connected to a source line (not shown) and a source/drain 7515 of at least one thin film transistor in the pixel driving circuit 751 is connected to a corresponding anode pixel electrode 771 of the anode layer 770.

The cathode layer 760 is disposed at one side of the upper substrate 110 facing the display material layer 730 and between the upper substrate 110 and the display material layer 730. The cathode layer 760 is formed with metal material, preferably metal material with thickness being less than 50 nm. The metal material is selectively to be aluminum, silver, magnesium, calcium, potassium, lithium, indium, and alloy thereof, or mixture of lithium fluoride, magnesium fluoride, lithium oxide and aluminum. Due to the thickness of the cathode layer 760 being less than 50 nm, the light generated by the display material layer 730 can pass through the cathode layer 760, so as to show images on the upper substrate 110. The cathode layer 760 is intact piece electrical connection, so that it can be used as a shielding. Moreover, the cathode layer 760 also receives the current coming from the anode pixel electrode 771.

The anode layer 770 is disposed at one side of the thin film transistor and sensing electrode layer 750 facing the display material layer 730. The anode layer 770 includes a plurality of anode pixel electrodes 771. Each of the anode pixel electrodes is corresponding to one pixel driving transistor of the pixel driving circuit 751 of the thin film transistor and sensing electrode layer 750. That is, each of the anode pixel electrodes is connected to a source/drain of the pixel driving transistor of the corresponding pixel driving circuit 751, so as to form a pixel electrode of a specific color, for example a red pixel electrode, a green pixel electrode, or a blue pixel electrode, or a white pixel electrode used in the present invention.

The display material layer 730 includes a hole transporting layer 731, an emitting layer 733, and an electron transporting layer 735. The display material layer 730 is preferably emitting white light, and using the color filter layer 160 to filter out and to generate red, blue, green primary colors.

Figure 9:
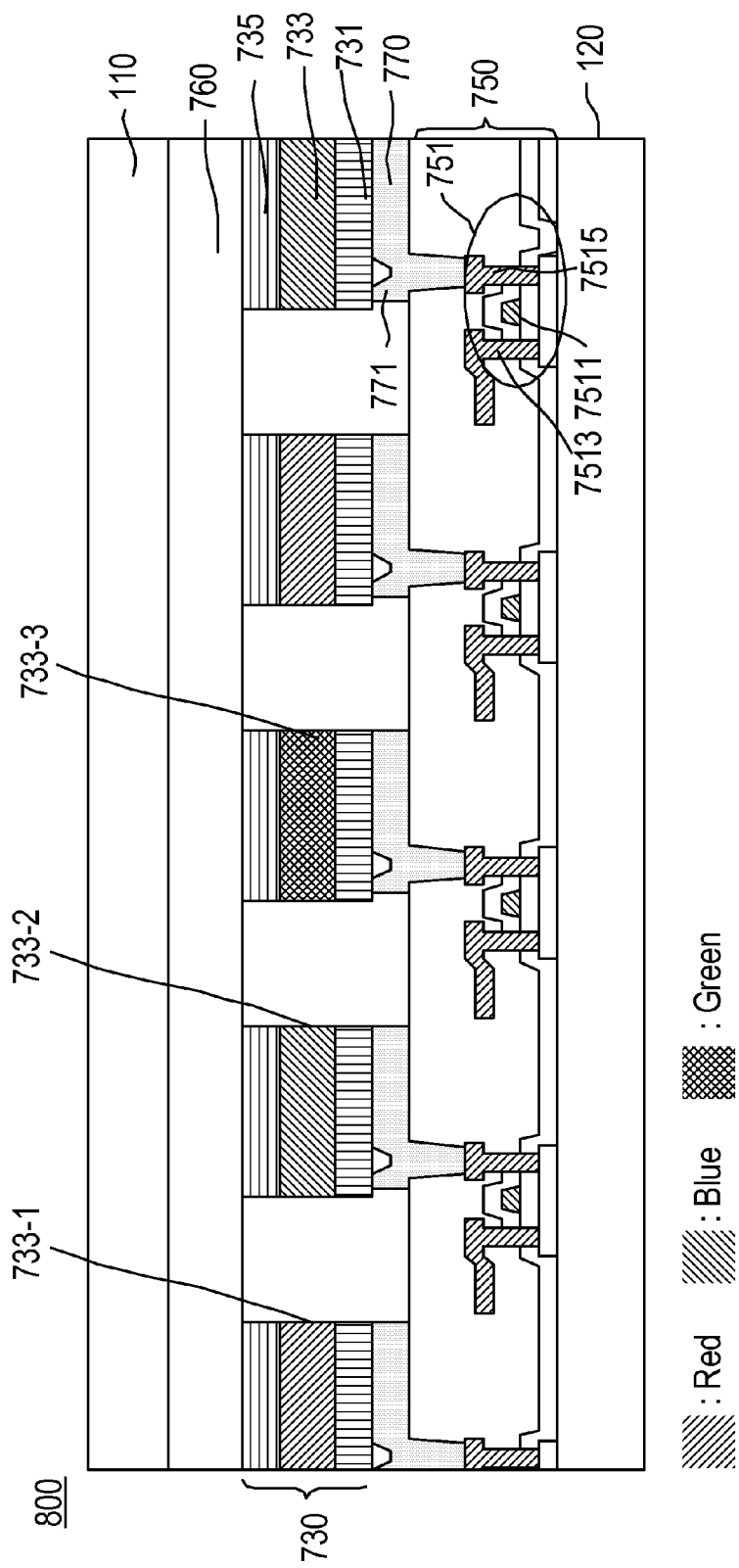
FIG. 9 is a stack-up diagram of a further embodiment according to the present invention.

FIG. 9 schematically illustrates a further embodiment of the present invention, which is a stack-up diagram of an in-cell touch display panel structure 800. As shown, the in-cell touch display panel structure 800 includes an upper substrate 110, a lower substrate 120, a display material layer 730, a thin film transistor and sensing electrode layer 750, a cathode layer 760, and an anode layer 770. FIG. 9 is similar to FIG. 8 except that, in the FIG. 9, a red light emitting layer 733-1, a blue light emitting layer 733-2 and a green light emitting layer 733-3 are employed so that there is no need to use the black matrix layer 140, the color filter layer 160 and the over coat layer 170.

In view of forgoing, it is known that the present invention is able to form, on the thin film transistor and sensing electrode layer 150, the first sensing conductor segments 320 arranged in the first direction and the second sensing conductor segments 340 arranged in the second direction, such that there is no need to provide a sensing electrode layer made of ITO material on an upper or lower glass substrate of a display panel, thereby reducing the manufacturing cost and simplifying the manufacturing process.

Although the present invention has been explained in relation to its preferred embodiment, it is to be understood that many other possible modifications and variations can be made without departing from the spirit and scope of the invention as hereinafter claimed.

What is claimed is:

1. An in-cell touch display panel structure, comprising:
   an upper substrate;
   a lower substrate parallel to the upper substrate;
   a display material layer configured between the upper substrate and the lower substrate;
   a black matrix layer disposed at one surface of the upper substrate facing the display material layer, the black matrix layer being composed of a plurality of opaque lines; and
   a thin film transistor and sensing electrode layer disposed at one side of the lower substrate facing the display material layer, wherein the thin film transistor and sensing electrode layer includes:
   a gate line sub-layer including a plurality of gate lines arranged in a first direction, and a plurality of first sensing conductor segments arranged in the first direction and parallel to the plurality of gate lines; and
   a source line sub-layer disposed at one side of the gate line sub-layer facing the display material layer, including a plurality of source lines arranged in a second direction, and a plurality of second sensing conductor segments arranged in a second direction and parallel to the plurality of source lines;

wherein the plurality of first sensing conductor segments and the plurality of second sensing conductor segments are disposed at positions corresponding to those of the plurality of opaque lines of the black matrix layer, the plurality of second sensing conductor segments are divided into a first group including a plurality of second sensing conductor segments and a second group including a plurality of second sensing conductor segments, and the plurality of second sensing conductor segments of the first group and the plurality of first sensing conductor segments are formed with N quadrilateral regions, where N is a positive integer and any two quadrilateral regions are not connected with each other, so as to form a single-layered touch pattern on the thin film transistor and sensing electrode layer.

2. The in-cell touch display panel structure as claimed in claim 1, wherein the plurality of gate lines and the plurality of source lines are disposed at positions corresponding to those of the plurality of opaque lines of the black matrix layer.

3. The in-cell touch display panel structure as claimed in claim 2, wherein the second sensing conductor segments of the second group are formed with N conductive traces, and each of the N conductive traces is electrically connected to a corresponding quadrilateral region, while any two conductive traces are not electrically connected.

4. The in-cell touch display panel structure as claimed in claim 3, wherein the plurality of first sensing conductor segments and the plurality of second sensing conductor segments are made of conductive metal material.

5. The in-cell touch display panel structure as claimed in claim 4, wherein the conductive metal material is selectively to be chromium, barium, aluminum, silver, copper, titanium, nickel, tantalum, tungsten, magnesium, calcium, potassium, lithium, indium, and alloy thereof, mixture of lithium fluoride, magnesium fluoride, oxide and aluminum.

6. The in-cell touch display panel structure as claimed in claim 1, wherein display material layer is a liquid crystal layer.

7. The in-cell touch display panel structure as claimed in claim 6, further comprising:
  a color filter layer disposed on one surface of the black matrix facing the display material layer;
  a common electrode layer disposed between the upper substrate and the lower substrate;
  a first polarizer layer disposed at the other side of the display material layer opposite to the side facing the upper substrate; and
  a second polarizer layer disposed at the other side of the display material layer opposite to the side facing the lower substrate.

8. The in-cell touch display panel structure as claimed in claim 1, wherein the display material layer is an OLED layer.

9. The in-cell touch display panel structure as claimed in claim 1, wherein the first direction is vertical to the second direction.

10. An in-cell touch display panel structure, comprising:
an upper substrate;
a lower substrate parallel to the upper substrate;
a display material layer configured between the upper substrate and the lower substrate; and
a thin film transistor and sensing electrode layer disposed at one side of the lower substrate facing the display material layer, wherein the thin film transistor and sensing electrode layer includes:
a gate line sub-layer including a plurality of gate lines arranged in a first direction, and a plurality of first sensing conductor segments arranged in the first direction and parallel to the plurality of gate lines; and
a source line sub-layer disposed at one side of the gate line sub-layer facing the display material layer, including a plurality of source lines arranged in a second direction, and a plurality of second sensing conductor segments arranged in the second direction and parallel to the plurality of source lines;
wherein the plurality of second sensing conductor segments are divided into a first group including a plurality of second sensing conductor segments and a second group including a plurality of second sensing conductor segments, and the plurality of second sensing conductor segments of the first group and the plurality of first sensing conductor segments are formed with N quadrilateral regions, where N is a positive integer, and any two quadrilateral regions are not connected with each other, so as to form a single-layered touch pattern on the thin film transistor and sensing electrode layer.

11. The in-cell touch display panel structure as claimed in claim 10, wherein the second sensing conductor segments of the second group are formed with N conductive traces, and each of the N conductive traces is electrically connected to a corresponding quadrilateral region, while any two conductive traces are not electrically connected.

12. The in-cell touch display panel structure as claimed in claim 11, wherein the plurality of first sensing conductor segments and the plurality of second sensing conductor segments are made of conductive metal material.

13. The in-cell touch display panel structure as claimed in claim 12, wherein the conductive metal material is selectively to be chromium, barium, aluminum, silver, copper, titanium, nickel, tantalum, tungsten, magnesium, calcium, potassium, lithium, indium, and alloy thereof, mixture of lithium fluoride, magnesium fluoride, oxide and aluminum.

14. The in-cell touch display panel structure as claimed in claim 13, wherein the display material layer is an OLED layer.

15. The in-cell touch display panel structure as claimed in claim 14, wherein the first direction is vertical to the second direction.

* * * * *